FIG. 1

INVENTORS
WALTER H. RUDDER
ROY K. RUBRIGHT
BY
ATTORNEY

April 14, 1970 W. H. RUDDER ET AL 3,506,755
MOLDING APPARATUS AND METHODS
Filed June 12, 1967 6 Sheets-Sheet 2

INVENTORS
WALTER H. RUDDER
ROY K. RUBRIGHT
BY
ATTORNEY

INVENTORS
WALTER H. RUDDER
ROY K. RUBRIGHT
BY
ATTORNEY

INVENTORS
WALTER H. RUDDER
ROY K. RUBRIGHT
BY
ATTORNEY

United States Patent Office 3,506,755
Patented Apr. 14, 1970

3,506,755
MOLDING APPARATUS AND METHODS
Walter H. Rudder, Akron, and Roy K. Rubright, Tallmadge, Ohio, assignors to The Goodyear Tire & Rubber Company, Akron, Ohio, a corporation of Ohio
Filed June 12, 1967, Ser. No. 645,385
Int. Cl. B28b 5/02; B29c 5/04, 7/00
U.S. Cl. 264—297                                    4 Claims

ABSTRACT OF THE DISCLOSURE

This invention relates to an apparatus and method of using said apparatus for molding thermoplastic materials. The apparatus comprises a conveyor system for the mold and a conveyor system for the slush box, means to heat the mold, means to cool the mold, means to mate the mold and slush box, means to separate the mold and slush box after the slush box and mold have moved as a unit through a slushing station. The conveyor systems for the slush box and the mold being operated normally continuously but being stopped periodically at the stations along the conveyor, including a station for stripping the molded article from the mold.

---

The invention relates to an apparatus for slush molding thermoplastic material and to a method of operating said apparatus.

The slush molding of articles of appreciable size such as automobile crash pads, covers for automobile seat cushions, other interior automobile elements and chairs, divans and furniture parts presents the problem of obtaining rapid uniform heating and also of handling the mold as well as the slush box to obtain an economical rate of production.

A principal object of this invention is to provide an apparatus and method of using said apparatus to permit thermoplastic articles of appreciable size to be molded in an economical manner.

Other objects and advantages of this invention may be more readily apparent by reference to the drawings wherein.

Figure 1:
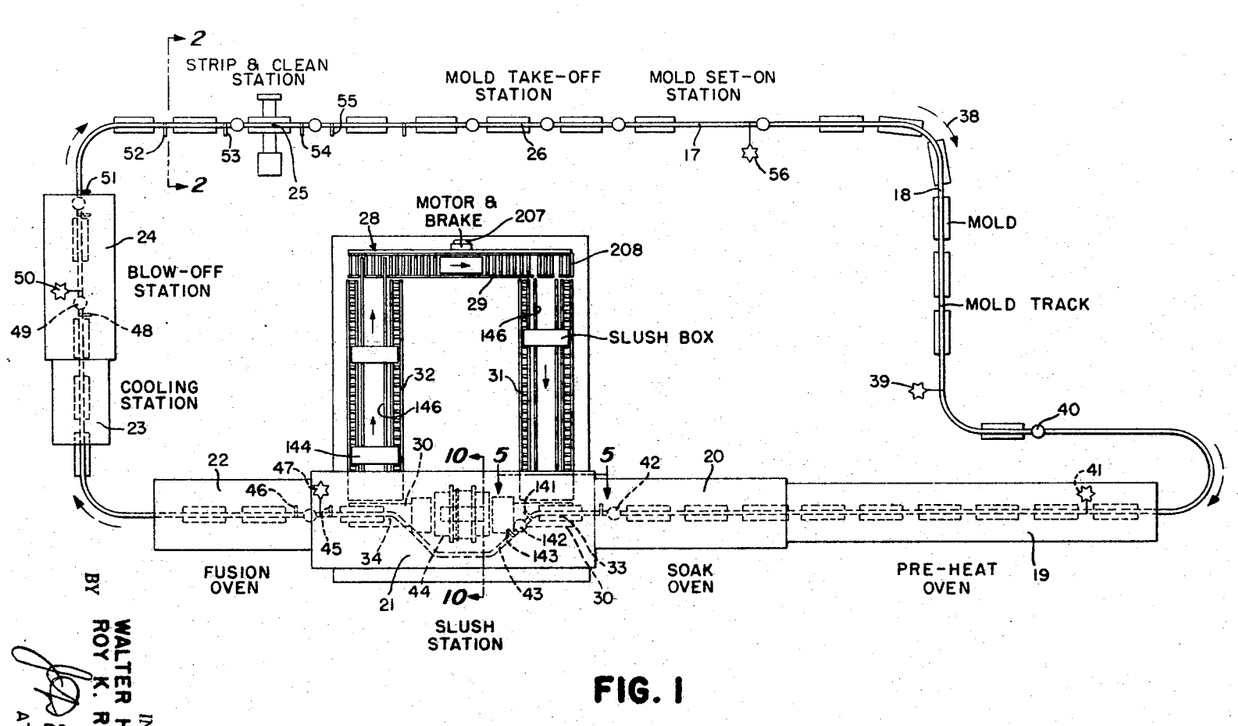
FIG. 1 is a schematic plan view of an apparatus for a thermoplastic molding system, showing the units or stations along a dual conveyor assembly.

The nature of the apparatus of this invention may be more readily understood by reference to FIG. 1 where a schematic plan view of the apparatus is shown. This apparatus includes a dual conveyor system for moving the molds and slush boxes independently through their respective cycles but yet moves them as an integral unit through a series of operations to achieve the object of contacting the hot mold with the thermoplastic molding material to obtain a build-up of the molded article of the desired dimensions and sizes without converting all the thermoplastic material of the slush box into a fused mass. The conveyor system for the mold preferably moves continuously to carry the mold through successive stages to vary the temperature of the mold within desired ranges. The successive stages on the mold conveyor system preferably includes a mold set-on station 17, a mold storage area 18, a pre-heat station 19, a heat soak station 20, a slushing station 21, a fusing station 22, a cooling station 23, a blow-off station 24, a strip and clean station 25 and a station for taking off molds 26.

From FIG. 1 it may be seen that as the molds move through these successive stages means are provided for stopping the mold for a predetermined time interval within said station to permit certain work to be achieved on the mold or the mold to acquire certain designated physical conditions such as the desired temperature. Thus, the conveyor system for the molds moves continuously but means are provided for stopping the molds in each of these stages, if desired, as may be more clearly seen by reference to FIG. 3 for a view of the mold carrier mechanism 27.

The slush box conveyor system 28 comprises a pair of parallel longitudinal sections 29 and 30 and a pair of parallel transverse sections 31 and 32. One of the longitudinal sections 30 of the slush box conveyor moves the slush box and mold as an integral unit through the slushing station 21 and then one of the transverse slush box conveyor sections 32 moves the slush box away from the slushing station to the other longitudinal slush box conveyor section 29 where it is returned to a position here the other transverse conveyor section 31 can return the slush box to a position within the first longitudinal conveyor section 30.

Since the mold and slush box must come into precise register and index in the mating stage 33, certain unique arrangements of indexing, elevating and conveying means are required to effect the desired mating of the mold and slush box within the slushing station. Likewise, equipment must be provided for separating the mold and slush box in the separating stage 34 and yet leave the mold in a position where it may be conveyed through the rest of the mold conveyor system to be returned to the slushing station for the next operation.

The specific nature of the novel arrangement of the equipment for achieving cooperative and synchronized successive movement of mold and slush box along their respective conveyor systems to be mated for a short time and to permit thermoplastic molding material to be added to the mold may be more readily understood by reference to the detailed drawings of the various stations along the mold conveyor system and of the means for transferring the slush box from the transverse section to the longitudinal section of the slush box conveyor system and vice versa. For instance, the molds are placed on the conveyor system in the mold set-on station 17 of FIG. 1. Then when the mold carrier means 27 is started by activating the mold stop mechanism associated with the station, this causes the finger-like projection 35 on the mold carrier means 27 to move upward to contact the dog 36 on the continuously moving chain 37.

Thus, the continuously moving chain with the finger of the mold carrier means in contact with the dog moves the mold along the conveyor system in the direction shown by the arrow 38. Hence the mold moves from the mold set-on station 17 into the mold reserve storage area 18 where the mold is stopped by the contact of the mold with a mold stop mechanism 40 in cooperation with a star-type controller 39. Then the mold upon the proper actuation of the mold stop mechanism 40 is again released and the finger on the mold carrier means again makes contact with the dog of the chain to move the mold forward through successive stations on the mold conveyor system until the mold ultimately is returned to its starting point to again begin its cycle.

To follow the mold in this cycle it is to be noted that the mold moves along the mold conveyor system to and through a pre-heat oven, which preferably is a gas fired radiant section type oven. Within this pre-heat oven or station is a star-type controller 41 which regulates the time the mold is within the pre-heat station and also the number of molds that are within this station. For instance, FIG. 1 shows six molds within the preheat oven with three molds within the succeeding soak oven area 20. It is to be understood that the molds remain within the pre-heat and soak oven station for the desired length of time to acquire the desired temperature, usually about 10 to 75° F. and preferably about 20 to 50° F. above the fusing point of the thermoplastic molding material.

When this time has elapsed, a timed delay relay switch associated with stop 42 is activated to activate the stop mechanism to cause the finger on the mold carrier mechanism to move upward again to contact the dog of the continuously moving chain. Thus the mold moves into the mating area 33 over the longitudinal conveyor 30 to be stopped by mold stop means 142.

As the mold moves into the mating area it first must be mated with a slush box being brought into the mating area from the associated transverse section 31 of the slush box conveyor system. Mating of the mold with the slush box is achieved by a suitable indexing and registering mechanism in coperation with an elevation means. Thus, as the indexing and registering mechanism guides the mold and slush box into position for mating, the elevation mechanism moves the slush box upward to contact the mold suspended upside down from the mold conveyor system and thereby lift the mold upward sufficiently to unhook the mold from the conveyor system. This lifting of the mold permits it to move on the longitudinal conveyor section 30 in an integral mated relationship with the slush box through the slushing station while the mold carrier mechanism moves around the slush station on a by-pass track 43 again to be attached to the mold after the mold has been through a mold turnover assembly 44 to provide thermoplastic molding powder to form the desired molded article.

When the mold and slush box as an integral unit moves from the mating position through the mold turnover assembly, it comes to a separation station 34. In the separation station the slush box and mold are stopped as a unit and are lowered to bring the mold again into contact with the mold carrier mechanism 27 to again leave the mold suspended in its upside down position from the mold carrier. Consequently further lowering of the slush box will affect a separation of the mold and slush box to leave the slush box resting upon the conveyor of longitudinal section 30 ready to be transferred to the transverse section 32 of the slush box conveyor system.

With the mold again attached to the mold conveyor mechanism 27 a delayed timer 45 is activated by the running of the time set thereon to activate the mold stop mechanism for attaching the mold carrier mechanism to the dog of the chain and thus move the mold from the separation station into the fusing oven station.

As the mold moves into the fusing oven station, it again activates a delayed timer 46 which has been set for a pre-determined time and also the star controller 47 which regulates the number of molds that are within the fusing oven station at any interval of time by controlling the mold stop means in this station. When the time set on the delayed timer 46 has expired, it again activates the mold stop mechanism associated with this station to affect contact between the finger on the mold carrier mechanism and the dog on the chain to move the mold from the fusing over station to and through a cooling station where the hot mold is contacted with a suitable cooling medium such as air or preferably jets of water to cool the mold down to a temperature sufficient to permit the thermoplastic material to be removed from the mold at the appropriate station. This temperature usually is at least about 140° F. and preferably 160° F. below the fusing temperature of the thermoplastic molding material depending on the fusing temperature and nature of the thermoplastic material. It should be evident that the amount of plasticizer in the thermoplastic material, for instance, polyvinyl chloride, will effect this stripping temperature.

As the mold moves from the cooling station into blow-off station 24, it is contacted preferably with a stream of air to remove any water that may be hanging on the mold and thereby prevent water from getting inside the mold and causing defective product to be produced. Also, as the mold moves through the blow-off station, it closes a limit switch 48 which activates the mold carrier stopping mechanism 49 to retract the finger on the mold carrier mechanism to unhook said finger from the dog on the chain and thereby stops the mold within the blow-off station. It should be noted that associated within the limit switch 48 within the blow-off station is a star controller 50 which controls the number of molds within said station. Thus when the mold has been in this station 24 a sufficient length of time to achieve the desired drying and removal of excess water from the mold, the mold carrier mechanism is again activated by the timed delay switch associated with the star controller 50 to effect contact between the finger thereof and the dog of the chain to move the mold to and through the stripping and cleaning station 25. It should be noted that as the mold moves from the blow-off station to the stripping and cleaning station it contacts a series of limit switches 51, 52 and 53 which activate and deactivate the desired time sequence controller to activate and deactivate the mold stop mechanism for operating the finger on the mold carrier mechanism to contact and break contact of the finger with the dog on the chain and thereby control the movement of the mold into and through the strip and clean station.

In the strip and clean station the molded article is removed from the mold and the mold is cleaned to get it in condition to return to the slushing station. Thus, when the time on the delayed timer 54 which was activated by limit switch 53 has expired, it activates the mold stop mechanism for moving the finger up and down on the mold carrier mechanism to cause the finger to again move upward to contact the dog on the chain to move the mold from the strip and clean station into the mold take-off station.

As the mold moves from the strip and clean station it activates limit switch 55 and a star controller 56 connected electrically with this station to regulate the number of molds that may be within the mold take-off station and the mold set-on station. The molds remain in these stations until the demand for molds within the preheat oven station is communicated electrically to this station to activate the finger mechanism to again achieve operating contact between the mold carrier and the mold carrying chain to move the mold along the carrier in response to the activation of the star controller 41 within the preheat oven.

Figure 5:
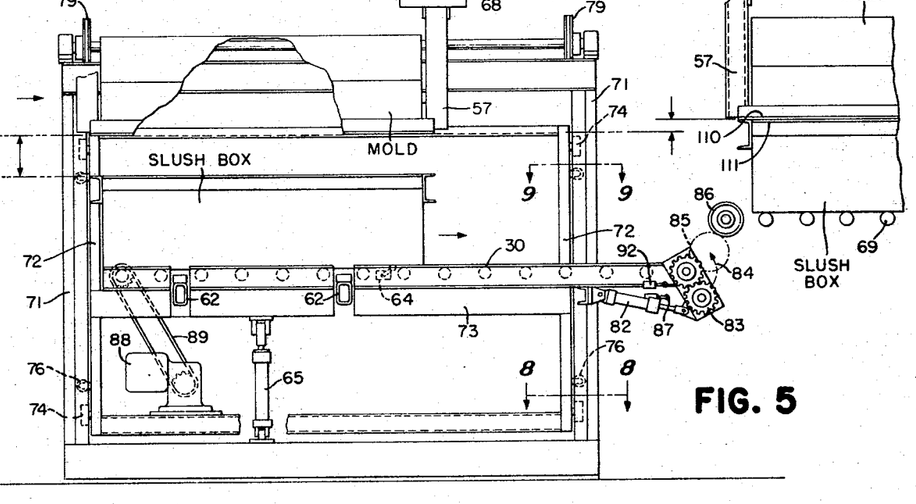
FIG. 5 is a side elevational view of the slush box lift assembly, taken on line 5—5 of FIG. 1.
Figure 6:
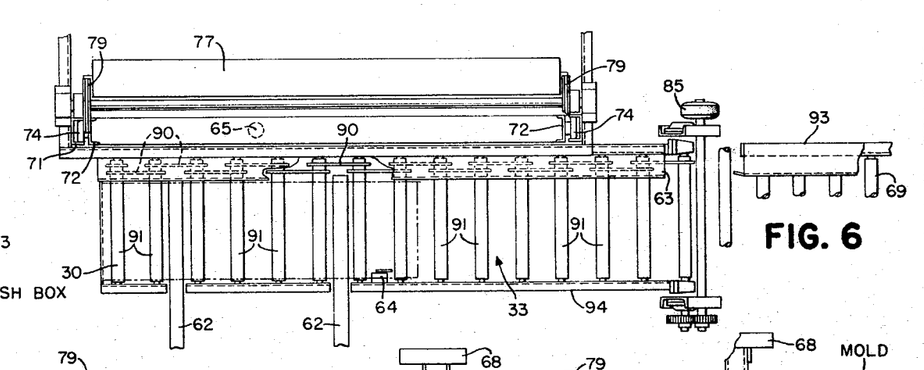
FIG. 6 is a plan view of FIG. 5.
Figure 7:
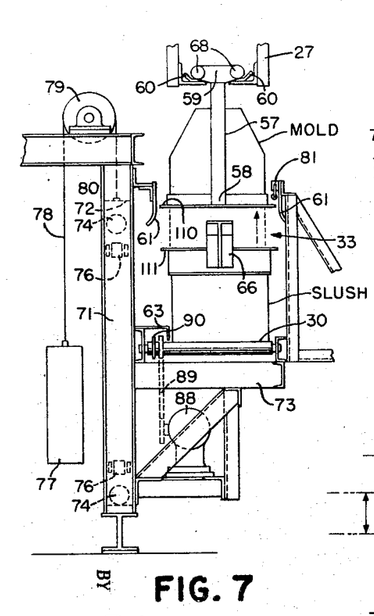
FIG. 7 is an end elevational view of FIG. 5 showing the mold and slush box supported as a unit on a cantilevered platform.

The operation of mating the mold and the slush box may be more readily understood by reference to FIGS. 5, 6 and 7. Referring specifically to FIG. 7 the mold is shown suspended in the upside-down relationship by a T-shaped member 57 having one end 58 attached to the mold and the crosshead 59 of the T resting within cradles 60 of the carrier mechanism 27. Thus, when the carrier mechanism 27 moves along the track it moves the mold within the mating station over the longitudinal section 30 of the slush box conveyor system. As the mold moves into position over the longitudinal section of the slush box conveyor system, it contacts a pair of parallel spaced apart curved guide members 61 which serve the function of aligning the mold up in a specific position over the top of the slush box which has been pushed into this portion of the longitudinal section of the slush box conveyor system by the parallel pusher beams 62 associated with the corresponding transverse section 31 of the slush box conveyor system. It should be noted that the parallel pusher beams 62 move the slush box within the longitudinal section of the slush box conveyor system until the slush box contacts the elongated member 63. When the slush box is pushed into substantial longitudinal contact with this elongated member 63, a limit switch 64 is activated to cause the pusher beams to move downward and out of contact with the slush box to leave the slush box resting on the longitudinal section of the slush box conveyor system in the manner best seen in FIGS. 5 and 7.

Figure 11:
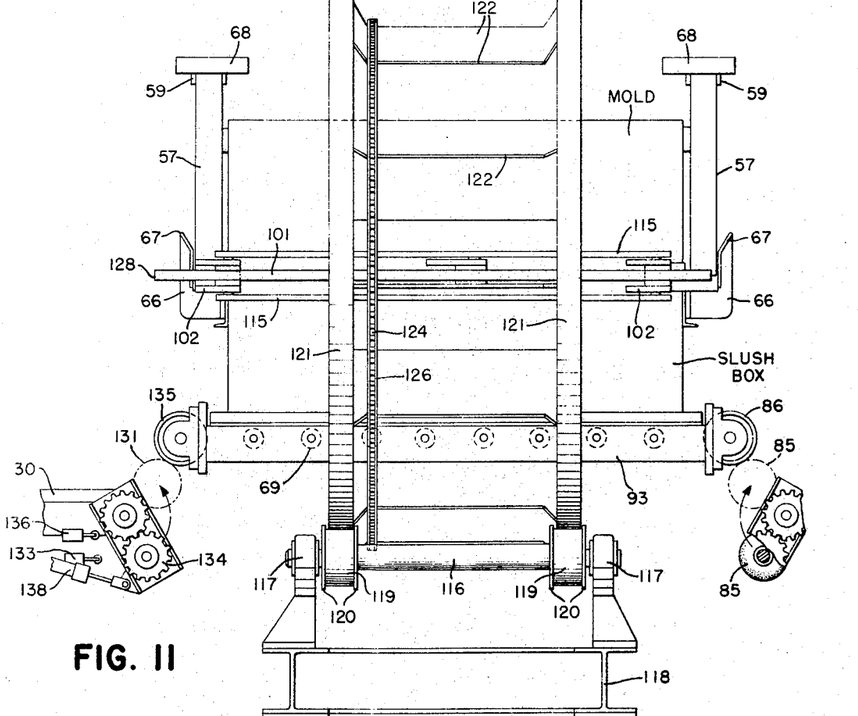
FIG. 11 is a side elevational view of the slush box and mold turnover assembly, showing the slush box and mold mated in a clamped relationship resting longitudinally on the turnover conveyor.

With the slush box resting on the longitudinal conveyor section in the manner shown in FIG. 5, the elevation mechanism associated with the mating station is activated by the appropriate limit switch 64 to cause the hydraulic cylinder 65 to move the conveyor system upward until the slush box and mold touch. Reference to FIG. 11 shows the slush box has a pair of projecting L-shaped members 66 positioned on each end thereof and these L-shaped members have a taper of about 45° at their top 67. These L-shaped members serve the function of moving the mold and slush box into register longitudinally as they are brought together. Thus, these L-shaped guide members cooperate with the curve guide members 61 to bring the mold and slush box in proper alignment and register to permit them to be mated as the elevation mechanism moves the slush box upward.

The elevation of the slush box continues until the mold has been moved upward sufficiently to move the crosshead 59 of the T-member 57 with its corresponding pivot members 68 out of their position of rest within the cradles 60 of the mold carrier mechanism 27. This upward movement of the mold causes a vertical displacement between the pivots and the cradles and this unhooks the mold from the mold carrier mechanism to thereby permit the mold and slush box to be movable along longitudinal section 30 of the slush box conveyor system while the mold carrier mechanism moves along the by-pass track 43. Reference to FIG. 5 shows the upward movement of the hydraulic ram 65 to free the mold from the mold carrier mechanism leaves the slush box essentially in alignment with the conveyor system 69 positioned within the turnover assembly 70. Activation of limit switch 81 stops ram 65.

Figures 8, 9, 10, 16:
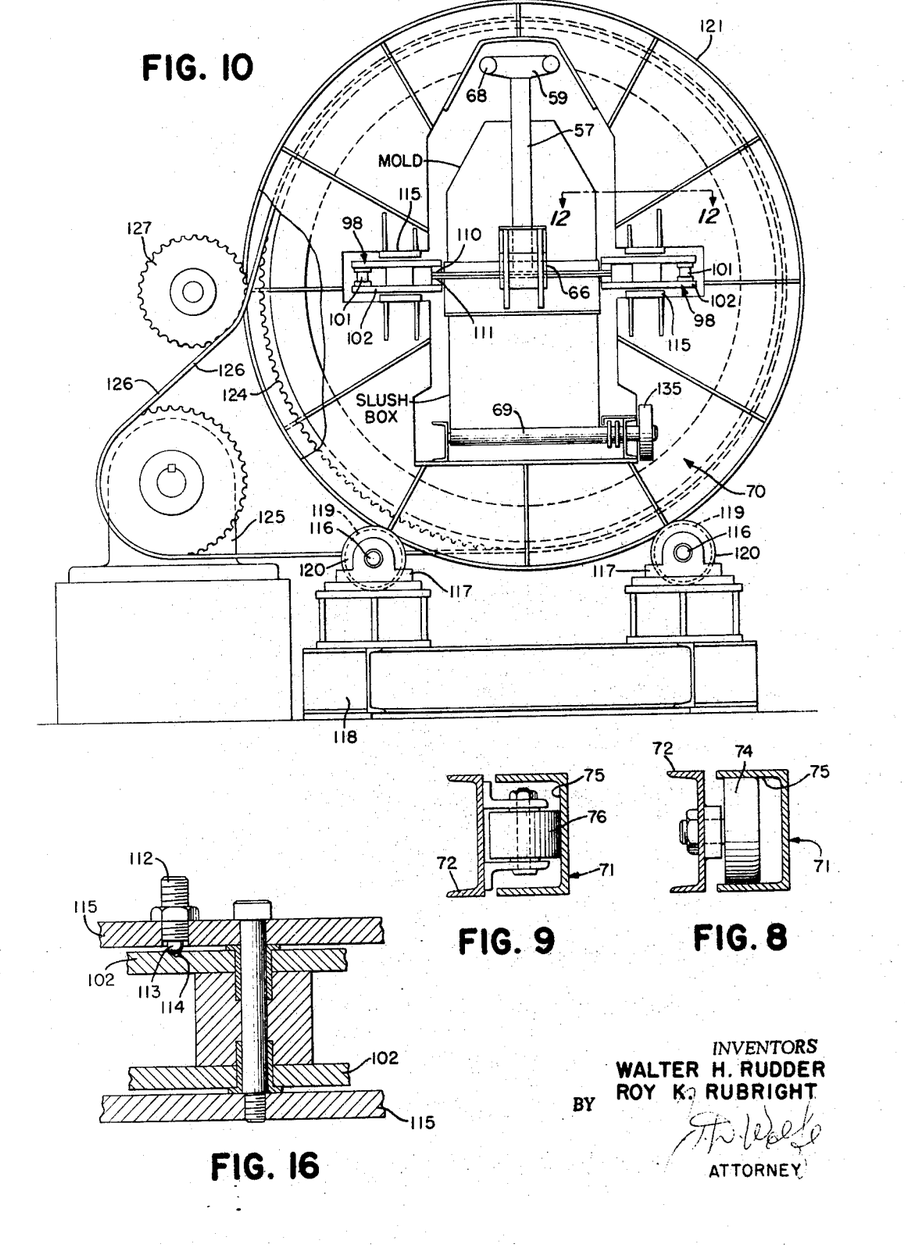
FIG. 8 is a detailed sectional view taken on line 8—8 of FIG. 5, showing the details of the thrust guide rollers of the lift assembly.
FIG. 9 is a detailed sectional view taken on line 9—9 of FIG. 5, showing the details of the transverse guide rollers of the lift assembly.
FIG. 10 is an end elevational view of the slush box and mold turnover assembly, taken on line 10—10 of FIG. 1.
FIG. 16 is an enlarged detail sectional view of the detent assembly taken along line 16—16 of FIG. 12.

From reference to FIGS. 5 and 7 it will be readily apparent that the mating equipment comprises an upright frame 71 having positioned therein a movable elongated member 72 having a platform 73 cantilevered outward therefrom. Since this elongated member 72 with the cantilevered platform moves up and down within the frame, it is equipped with wheels or guide rollers. These guide rollers or wheels may be more clearly seen by reference to FIGS. 8 or 9. For instance, the guide rollers 74 of FIG. 8 are positioned within a guide channel 75 and performs the function of maintaining the platform in substantially a fixed relationship within the vertical plane to thereby prevent sway of the platform within this plane. On the other hand, the function of the thrust wheel 76 of FIG. 9 is primarily to take the thrust exerted by the cantilevered platform against the upright members of the frame.

As the elevation mechanism is relatively heavy it should be noted that the weight of this elevation mechanism is effectively counterbalanced by means of a counterweight 77 which is suspended by cables 78 passing over the pulleys 79 and having one end 80 attached to the movable elongated member 72 and the other end attached to the counterweight. Use of this counterweight mechanism reduces the size of the hydraulic cylinder and the energy required to move this portion of the conveyor system with the associated slush box and mold up and down.

When the elevation mechanism has moved the slush box upward sufficiently to disconnect the mold from the mold carrier mechanism, this activates a limit switch 81 which causes the hydraulic cylinder 82 to move the gear mechanism 83 outward in the direction indicated by the arrow 84 to effect contact between a drive wheel 85 and a driven wheel 86. When contact is made between the drive wheel 85 and driven wheel 86, a limit switch 87 is activated to start motor 88 suspended beneath the platform. This motor in turn drives a chain 89 that drives the chains 90 connecting rolls 91 of the conveyor 94 in the mating system and thus moves the slush box from the mating station onto the conveyor 93 of the turnover assembly 70.

Figures 12, 13:
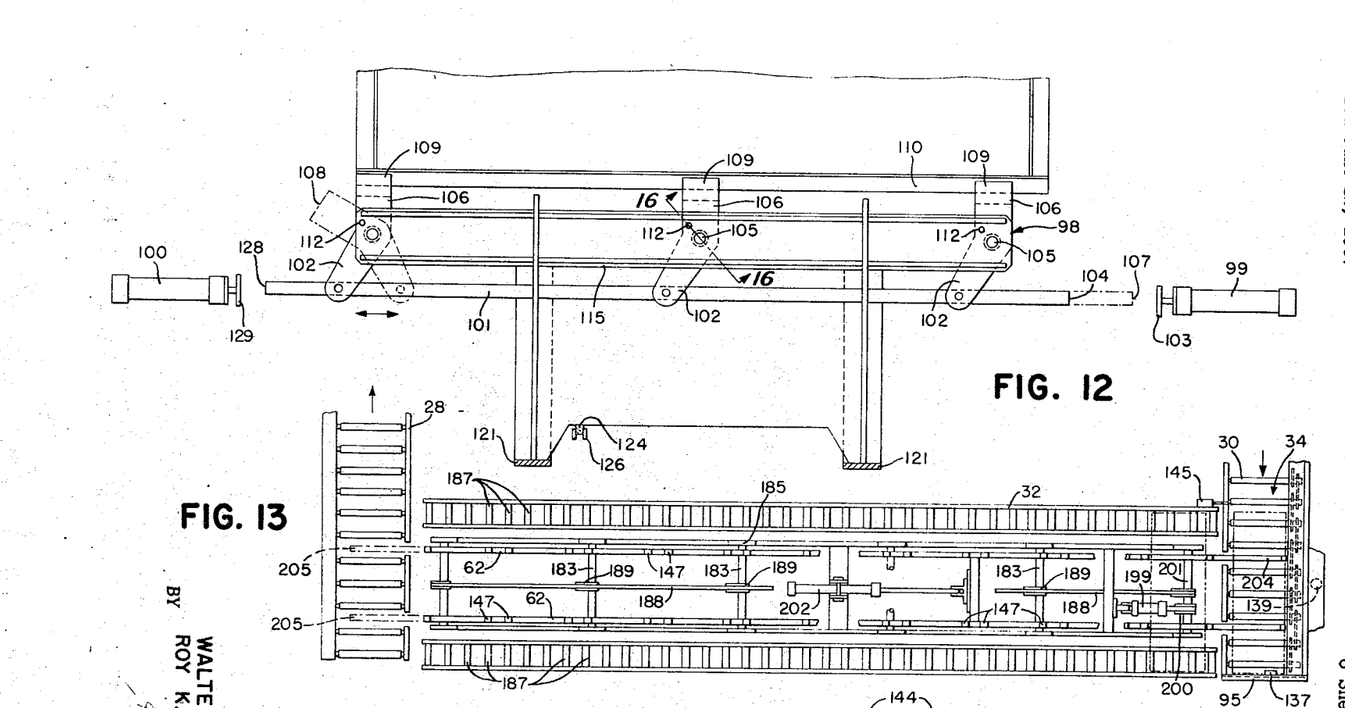
FIG. 12 is a plan view in partial section taken along line 12—12 of FIG. 10 of the slush box and mold turnover assembly, showing the mold and slush box locking means together with the hydraulic cylinders for actuating the locking means.
FIG. 13 is a plan view of a pushing beam assembly that is positioned in each of the transverse sections of the slush box conveyor system to transfer the slush box to and from the longitudinal sections of the slush box conveyor.

With the slush box and mold at rest within the turnover assembly of FIGS. 10 and 11 the mold and slush box must be locked in a fixed relationship prior to and during the time the rotation assembly is being rotated. This is achieved by activation of the locking assembly 98. This locking assembly comprises a pair of hydraulic cylinders 99 and 100 positioned fixedly outside the rotation mechanism but in substantial alignment with an elongated member 101 as best seen in FIG. 12. This elongated member has a series of rocker arms 102 pivotally attached thereto in the manner shown in FIG. 12. Thus, when hydraulic cylinder 99 is activated and the cap 103 thereof moves out and contacts the end 104 of this elongated member 101 to move it to the desired position shown in FIG. 12. The rocker arms 102 also move about their respective pivot points 105 to move the flange member 106 on the other end of the rocker arm back and forth through an arc of a circle. Movement of the elongated member from its initial position 107 shown in dotted outline to the position shown in full outline causes the flange on the end of the rocker arm to move from the position 108 (shown in dotted outline) to the position 109 (shown in full line). Thus the locking flange member moves into position 109 and ocntacts and grips the flanges 110 and 111 respectively of the mold and the slush box in the manner best seen in FIG. 10 to lock the mold and slush box together.

The hydraulic cylinders 99 and 100 must be retracted from within the turnover assembly 70 prior to rotation of the turnover mechanism, and elongated member 101 should be fixed in the desired position to retain the locking flange member on the flanges of the mold and slush box during the rotation of the mold and slush box.

This is achieved by a spring loaded plunger or detent 112 positioned on the rocker arms 102 shown in the enlarged detail view of FIG. 16. The pin 113 of the detent rests in the hole 114 of the plate 115 when the locking plunger member is in the position 109. Thus, the turnover assembly can be operated to dump thermoplastic mold material into the mold and return the excess to the slush box, without spillage of the thermoplastic material.

The nature of the turnover assembly may be more clearly seen and understood by reference to FIGS. 10 and 11. A pair of parallel spaced apart shafts 116 are mounted in pillow blocks 117 which rests on foundation 118. Two rolls 119 having retaining flanges 120 are positioned on each shaft in the manner best seen in FIG. 11. Resting within each of these flange rolls 119 is a cylindrical band 121 forming the framework of the turnover assembly. These bands are secured together by suitable cross bracing members 122 to give an open squirrel cage 123 which has resting therein a conveyor 93 and also positioned on the outside of the cage in the manner shown in FIGS. 10 and 11 is a gear 112 for rotating the cage. This gear is connected to a hydraulic motor 125 by an endless roller chain 126. Operative contact between this gear wheel and the hydraulic motor is achieved by varying the tension on the roller chain by tension gear 127.

With the slush box and mold in locked relationship as shown in FIG. 10 the rotation assembly can be rotated and this may be achieved by supplying suitable hydraulic fluid to the hydraulic motor 125 from a hydraulic source (not shown) to turn the squirrel cage upon the flange rolls on the pair of shafts journalled within the pillow blocks. The hydraulic fluid is supplied to the hydraulic motor preferably to turn the squirrel cage through an arc of at least 340° before it is returned to its original position and on to and through an angle in the reverse direction of at least about 340°. Rotation of the squirrel cage in a back and forth manner can be obtained by changing the direction of application of the hydraulic fluid to the motor. Also, its rotation can be adjusted to obtain the desired build-up of the fused thermoplastic material within the mold.

As soon as the rotation assembly has been rotated in the manner desired to fill the mold with thermoplastic molding powder and the excess has been dumped, the squirrel cage is brought back to the position shown in FIG. 10 to leave the mold resting in an upside down position above the open slush box. Now the hydraulic ram 100 at the other end 128 of the elongated member 101 of the locking assembly is activated to move its cap 129 out to contact the elongated member to return it to its original position where the end is at 107. The pressure of the hydraulic ram exerted on the elongated member to move it to its original position causes the detent pin to move out of the hole and allows the locking flange members 106 to return to position 108 to unlock the mold and slush box.

With the mold and slush box unlocked the conveyor associated with the turnover assembly is activated to move the mold and slush box out of the turnover mechanism into a position within the separation area 34 for effective separation of the mold and the slush box.

Although the conveyor and elevation mechanism located in the separation area 34 are of the type shown in FIGS. 5, 6 and 7, they are located in a left hand relationship relative to the turnover assembly 70 rather than the right hand relationship described heretofore in regard to its operation in the mating area and shown best in FIG. 5. Because of this left hand relationship the drive wheel of the elevation mechanism of FIG. 5 will correspond to driven wheel 131 when the elevation mechanism is positioned in the separating station.

To move the mold and slush box from the separation area, the conveyor system 130 is brought into horizontal alignment with the conveyor 93 by action of the hydraulic cylinder of the elevation mechanism which is activated by the passage of the time set on the delayed timer 143. The delayed timer also activates the limit switch 133 to move the gear mechanism outward under the influence of hydraulic cylinder 138 to move the drive wheel 131 into driving relationship with driven wheel 135. Rotation of driven wheel 135 by drive wheel 131 operates conveyor 93 to move the mold and slush box as a unit from the turnover assembly into the separation station. Bringing wheels 131 and 135 in cooperative relationship activates limit switch 136 to start the motor (not shown) for driving the conveyor 130. This motor continues to run until the slush box contacts stop 95 which closes a limit switch 137 that subsequently stops the motor, retracts the ram of hydraulic cylinder 138 to stop conveyor 93 and causes hydraulic cylinder 139 to move conveyor assembly 130 downward.

The downward movement of the elevation mechanism in separation area 34 causes the pivot members 140 on the end of the crosshead 58 of T-shaped member 57 of the mold to contact cradles 60 of the mold carrier mechanism 27, which is presently stopped in this area since the limit switch 141 had been activated by the passage of the mold carrier mechanism. This in turn activated the stop 142 which stopped the carrier in this position and started delayed timer 143. As the hydraulic cylinder 139 moves the elevation mechanism downward in the separation area the mold eventually is supported entirely by the mold carrier mechanism to separate the mold from the slush box.

The hydraulic cylinder 139 continues to contract until the conveyor of the separation area is in substantial vertical alignment with transverse section 32 of the slush box conveyor assembly, at which time a limit switch 145 stops the contraction of hydraulic cylinder 139 and starts the pusher assembly 146. With the conveyor in this position the cleats 147 on the pusher beams 62 associated with transverse section 32 of the conveyor assembly is able to contact the slush box in the manner best shown in FIG. 14 and pull it from the longitudinal conveyor onto transverse section 32 in the manner best seen in FIGS. 1 and 14 where the slush box is indicated by numeral 144.

As the mold is now again attached to the mold carrier mechanism 17 by means of the T member 57 which has its pivots 154 resting in the cradles 60 of the carrier mechanism 27, the mold is carried along the conveyor when the time on delayed timer 143 runs, successively through the fusion oven station, the cooling station, the blow-off station and the strip and clean station.

As the mold moves from station 34 it will contain some thermoplastic material that has not fused and set. Consequently, it is desirable that the mold pass through a fusing station 22. Although the mold may be heated in the fusing station by direct contact with a gas flame, it is preferred that this be a more gentle heating and that the fusion station be heated by a hot gas or radiation rather than a direct flame. As the mold moves from the fusing station 22 into station 23 the mold is most effectively cooled by contacting the mold with jets of cold water. If the streams of water are directed against the top and sides of the mold no water will come in contact with the molded article since the mold is hanging upsided own. With the mold cooled to a temperature sufficient to permit the molded article to be removed, normally about 50 to 100° F. below its fusing temperature, the mold then moves into station 24 where it is contacted with a stream or streams of air to blow off any free water that would remain on the mold. This air treatment prevents the molded article from getting wet while the article is being stripped from the mold in strip and clean station 25.

The mold comes into the strip and clean station suspended from the conveyor track with the opening of the mold downward. This presents a problem for the person stripping the molded article from the mold as the mold is inconvenient for a human operator to remove the molded article from the mold and clean the mold even if the operator is positioned in a pit. Therefore, it is desirable to rotate the mold into a position where the opening of the mold will be at a suitable elevation and position for the operator to remove the molded article from the mold. The apparatus for achieving this desirable feature is best seen and illustrated in FIGS. 2, 3 and 4.

Figure 2:
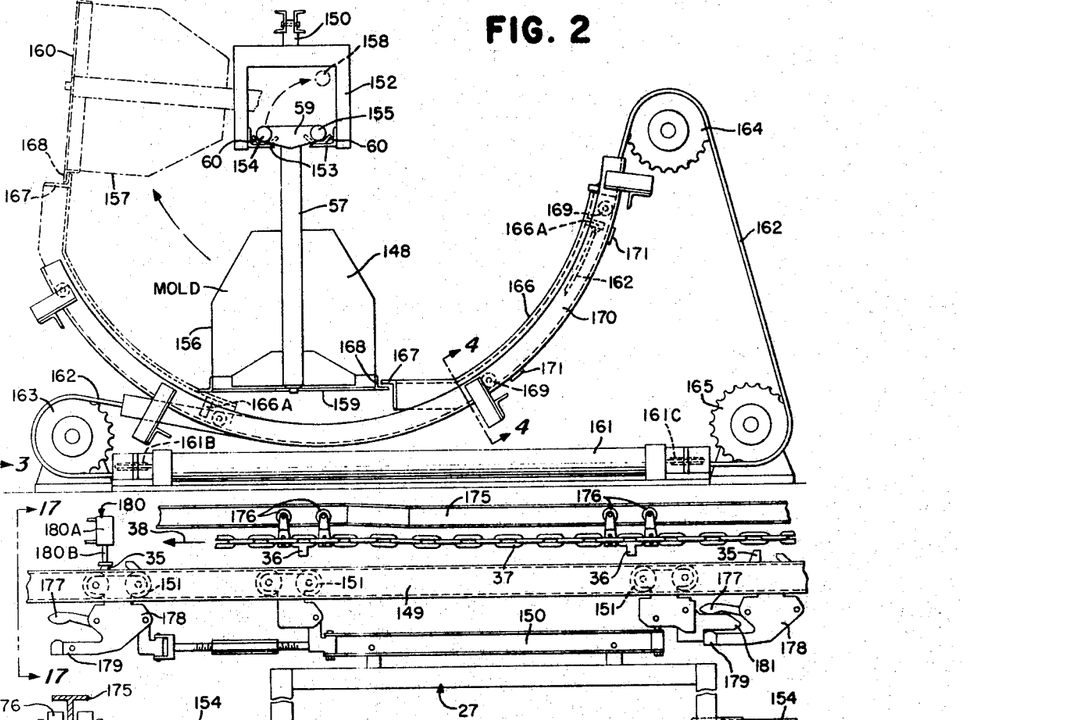
FIG. 2 is an end elevational view of the strip and clean unit taken on line 2—2 of FIG. 1.

Referring more specifically to FIG. 2 it will be readily apparent that the mold 148 is suspended from the mold track 149 by the suspending means 150. The mold suspending means 150 comprises a pair of rotary wheels 151 having connection with an open rectangular shaped member 152. The rectangular shaped member 152 has two flanges 153 positioned in the manner best seen in FIG. 2. Supported on each of these flanges or welded thereto is a U-shaped cradle 60. Resting within the cradle 60 is a T-shaped member 57. The crosshead 59 of the T-shaped member terminates at each end in two round rods or pivot members respectively designated as 154 and 155.

The function of these pivot members 154 and 155 readily can be understood by reference to FIG. 2. They permit the mold to be pivoted from the position shown by numeral 156 to the position shown by the arrow 157 to rotate the mold through an angle of at least about 45° to about 90°. Thus, as the mold is moved from the position 156 to the position 157 the rod designated as 154 moves out of the cradle 62 up into the position indicated by numeral 158. Thus, the rod designated as 155 acts as a pivot in the cradle 62 to permit the mold to be rotated about this pivot point and thereby bring the mold into the position designated as 157 where the opening 159 of the mold is moved from a downward position to a position in the vertical plane as designated by the numeral 160. Thus, with the mold opening displayed in the vertical plane and at an elevation about even with the chest of an operator the operator may readily remove the molded article from the mold and clean the mold to prepare it for the next cycle of the molding operation.

Figures 3, 4, 17:
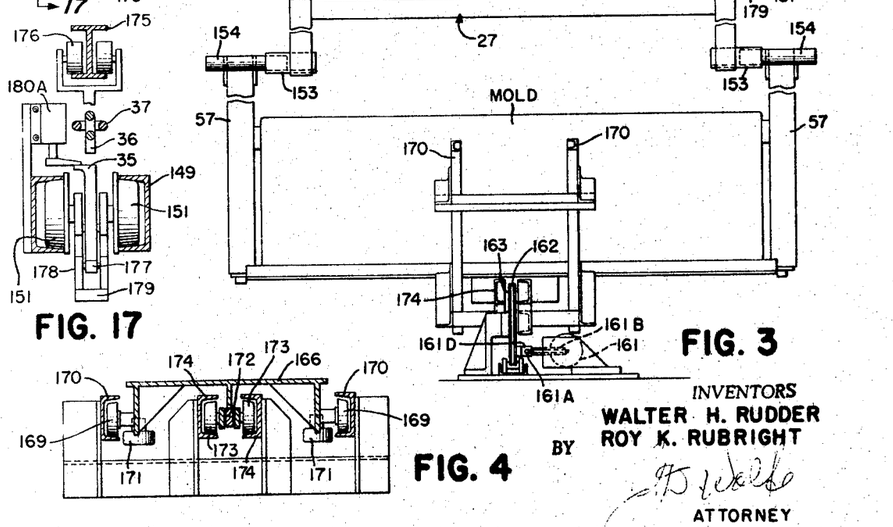
FIG. 3 is a side elevational view of the strip and clean unit taken on line 3—3 of FIG. 2.
FIG. 4 is a detailed sectional view through the track of the strip and clean unit, taken on 4—4 of FIG. 2.
FIG. 17 is an enlarged detailed view of the stop mechanism.

The mechanism for moving the mold from the position 156 to 157 is also shown in FIGS. 2, 3 and 4. The motive power for moving the mold in these directions is an air cylinder mechanism 161 a cable 161A about pulleys 161B and 161C which in turn are fastened by means of a clip 161D to chain 162 that passes over the sprockets 163, 164 and 165. It should be evident from the drawings that the ends of chain 162 are attached to the carriage 166 and carriage 166 can move in a direction whereby the bracket 167 on the carriage contacts the mold flange 168 to cause the mold to move from position 156 to 157 and back to the original position 156 under the proper actuation of the air cylinder 161 either manually or electrically in response to the action of limit switch 53.

Referring specifically to FIG. 3 the carriage 166 which has trolley wheels 169 mounted thereon moves along trolley tracks 170. From FIG. 4 it can be seen that the trolley wheels 169 run in the trolley track 170 with the guide wheels 171 serving to prevent the carriage from binding or locking as the wheels move to and fro within trolley track 170.

Each end of cable 162 is attached to the carriage pull means 172 which has a pair of cable trolley wheels 173 that rest in a guide means on tracks 174.

The nature of the mold carrier mechanism 27 may be more readily understood by reference to FIG. 3 which shows the mold conveyor assembly comprising a track 175 for an endless chain 37 suspended by pairs of wheels 176 spaced along the chain and a second track 149 holding and supporting the mold carrier mechanism 27. The endless chain is supported within the tracks in the manner shown in FIG. 3 and has at designated intervals depending on the size of the product to be molded dogs 36 projecting down from the chain which are contacted by a finger 35 associated with the mold carrying mechanism when the finger is in the elevated position.

Thus, as the chain moves along with the finger in contact with the dog, the mold is moved in the direction the chain is moving. This movement continues until the mold carrier attaching mechanism comes in contact with a stop member 180 associated with each mold stop mechanism or means. This stop member 180 is actuated through a suitable electric circuitry which is activated by finger 35 of the mold carrier mechanism contacting a limit switch associated with a solenoid valve (not shown) which admits fluid pressure to cylinder 180A to move piston 180B downward to push the finger 35 down from contact with dog 36. Piston 180B will remain in the down position until the time set on the timed delay relay has run at which time the piston 180B will retract. Upon the retraction of the activation means, the spring (not shown) of the activation mechanism moves the tongue downward to thereby move the finger upward where it contacts the dog. It should be noted that another benefit of this type of the mold carrier mechanism is that the succeeding mold coming upon a mold stopped in a position in front of it is likewise stopped when the tongue 177 of the finger activation mechanism comes in contact with the backward projecting member 181 which raises the tongue upward to retract the finger and thereby disengage the oncoming mold carrier mechanism from its operating contact with the dog of the chain.

Reference to FIG. 1 shows the slush box conveyor laid out in substantial rectangular arrangement with a pair of longitudinal sections and a pair of transverse sections arranged essentially in parallel relationship between the parallel longitudinal sections. Located within each of the transverse sections 31 and 32 of the slush box conveyor is a pusher assembly 146 for transfering the slush box from the corresponding longitudinal section thereof to the transverse section and then moving the slush box along the transverse section to the end thereof before transferring the slush box onto the succeeding longitudinal section of the slush box conveyor associated therewith.

Figure 14:
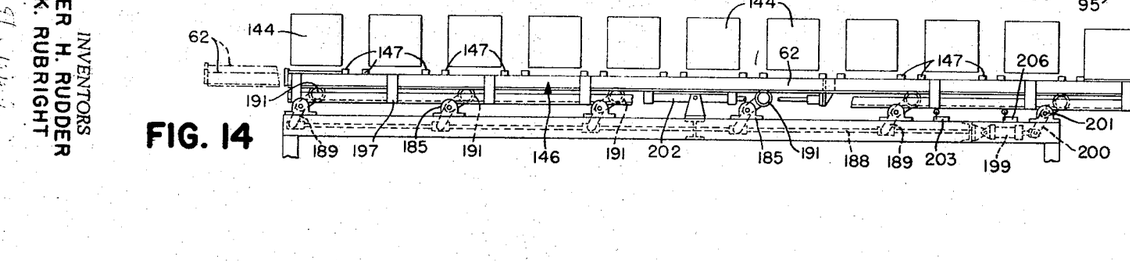
FIG. 14 is a side elevational view of FIG. 13 showing the details of the pushing beam assembly.
Figure 15:
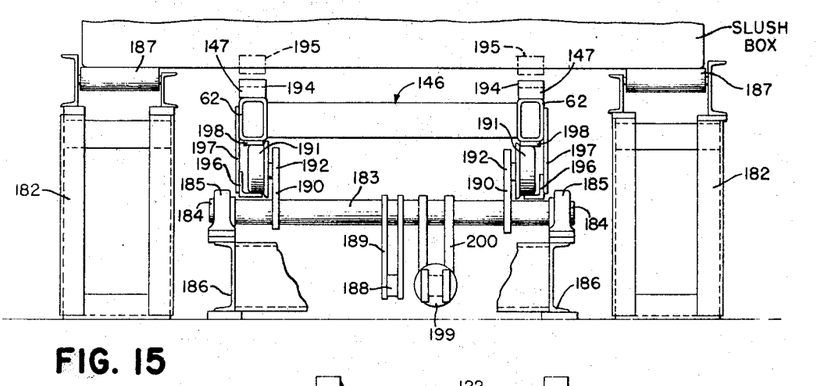
FIG. 15 is an end elevational view of FIG. 14 showing the position of the pushing beam assembly within a transverse section of the slush box conveyor.

The nature of this pusher assembly 146 may be more readily understood by reference to FIGS. 13, 14 and 15. FIG. 13 is a top plan view of transverse section 32 of the slush box conveyor showing its arrangement relative to the longitudinal conveyor sections 28 and 30. Although the arrangement of the pusher assembly in transverse section 31 is the same, the direction of movement of the slush box is opposite. Referring specifically to the nature of the transverse section 32 it should be noted that this transverse section comprises two sets of short parallel conveyor rolls 187 spaced apart in substantial parallel alignment on the outside of a pair of pusher beams 62. Referring more specifically to FIG. 15 it will be noted that these two sets of short parallel rolls in the transverse section are mounted on an upright framework 182 in the manner shown in FIG. 15 with the pusher assembly 146 positioned between the upward framing.

The pusher assembly in turn comprises a series of parallel shafts 183 positioned transversely within the length of the transverse section of the conveyor, each end 184 of these shafts being journalled in suitable pillow blocks 185 resting on a foundation 186. Each of these transverse shafts are connected to a longitudinal member 188 positioned below and substantially at the median of each of these shafts and extending throughout the length of said transverse section of the conveyor. This elongated member 188 is connected pivotally to each of the shafts by suitable linkage 189.

Also, a pair of standards 190 are positioned on the shafts in the manner shown best in FIG. 15. A pusher wheel 191 is rotatably mounted near the end 192 of each of these standards. These wheels are retained within a wheel trackway forming a part of the pusher beam frame. The wheel trackway comprises a lower angle member 196 welded to a straight member 197 projecting down from the support frame and a bearing member 198 welded beneath the frame to form a track about which the wheels may rotate as the standards are rotated through an arc about the shafts. It should be appreciated that as the standards are rotated about the shafts that the pusher beam frame will change its elevation from its low position 194 to its high position 195 depending on where the standard is positioned relative to the horizontal plane through the shaft. Rotation of the standards about the shaft is achieved by actuation of the hydraulic cylinder 199 which pushes on the linkage member 200 projecting downward beneath the front shaft 201 of the series of parallel transverse shafts. As was indicated previously when the limit switch 145 is activated, it in turn activates the hydraulic cylinder 199 to cause the cylinder to move outward and thus move the pusher beam frame from its low position 194 to its high position 195. When the pusher beam moves outward, it contacts a limit switch 203 which activates a second hydraulic cylinder 202 to cause the pusher beam frames to move from the position 204 within longitudinal section 30 of the conveyor system to a position 205 within longitudinal conveyor section 28.

Referring specifically to FIG. 14 it will be noted that the lugs 147 on the pusher beam when the pusher beam frame is in its up position extends up between the slush boxes. Thus when the hydraulic cylinder 202 is actuated, it moves the pusher beams 62 within conveyor section 30 to within conveyor section 28; accordingly, it moves the slush boxes forward sufficiently to move one slush box off of conveyor section 30 onto the transverse section 32 while simultaneously moving another slush box onto the conveyor section 28. When the hydraulic cylinder has moved the pusher beam frame from conveyor section 30 to within conveyor section 28, the limit switch 206 is activated which causes the hydraulic cylinder 199 to contract and thereby change the position of the standards relative to the horizontal plane and thereby return the pusher beam frame to its low position at which time the hydraulic cylinder 202 is activated to cause the pusher beam to return to its original position beneah the conveyor section 30 to begin a new cycle Now with a slush box resting on the conveyor section 28 limit switch 206 activates the motor 207 to cause the slush box to move to the other end of the conveyor section 28. When the slush box contacts stop 208 on the end of conveyor section 28, it activates the pusher beam assembly located in transverse conveyor section 31 to transfer the slush box from section 28 and moves another slush box into position in contact with elongated member 63 in the mating station to activate limit switch 64. Limit switch 64 stops the pusher assembly after it has been returned to its original position to wait activation by contact of another slush box with stop 208.

The operation of this apparatus may be more specifically illustrated with a thermoplastic molding fluid, i.e. a liquid or powder. Representative examples of these are a polyethylene, a polypropylene, a polyvinylchloride, and related polyvinyl compounds. Preferred results are obtained with dry plasticized polyvinylchloride powder as it permits the preheat oven to be operated at a relatively broad range of temperatures, usually at about 500–550° F. Thus, the initial heat may be by gas flame but preferably by a radiant oven, then the soak oven is preferably utilized to bring the mold temperature down to a very narrow range with an even heat all over. Usually this will be about 5–10° F. although a wider variation may be utilized when molding certain articles. Thus, we may utilize a temperature variation of 20–25° F. but by utilizing a hot gas in the soak oven it is possible to bring the mold down to a very even temperature and prevent the undesirable effect of obtaining articles having thin skins or in the alternate, being relatively porous.

Thus, from the above description of the invention it should be readily apparent that this apparatus permits molded articles of relatively large size, for instance, crash pads, to be made essentially continuously with the minimum number of operators, in fact, only one operator in the strip and clean station being necessary where means are provided for electrically or otherwise controlling the starting and stopping of the mold and slush box and then at the expiration of the desired time delay restarting the mold carrying apparatus to move it through the desired stations in the desired time intervals.

Also, it should be indicated that more than one article can be molded at a time where the molds are placed in the mold carrying mechanism in multiple units and the slush box is adapted to be mated with the multiple mold units being carried by the mold carrier mechanism.

While certain representative embodiments and details have been shown for the purpose of illustrating the invention, it will be apparent to those skilled in this art that various changes and modifications may be made therein without departing from the spirit or scope of the invention.

What is claimed is:

1. In an apparatus for molding thermoplastic materials the combination comprising means for moving a mold through successive stations to establish cooperative relationship with a means for moving a container for thermoplastic material; said means for moving the container including means for indexing and registering the mold and container in mated relationship and means to move the mold and container in mated relationship to and through a rotation station to a station for separating the mold and container; the successive stations through which the mold moves including at least one station having a means for heating the mold to the molding temperature, a station having a means for moving the container into register and index with the mold to achieve a mated relationship to thereby disengage the mold from the means to move the mold, a station for molding the thermoplastic article by rotation of the container and mold while in mated and locked relationship; a means for moving the container relative to the mold to effect a separation of the mold and container and position the mold in a reattached relationship to the means for moving the mold independent of the container, a station having means for fusing any unfused thermoplastic material remaining in the mold, a station having a means for cooling the thermoplastic material to stripping temperature and a station for stripping the molded thermoplastic material from the mold.

2. The apparatus of claim 1 wherein the means for heating the mold includes a radiant heater for first heating the mold and a hot gas heater for later heating of the mold.

3. The apparatus of claim 1 wherein the mold is suspended having the opening thereof downward from the means for moving the mold and the mold is rotated through at least an angle of 45° to about 90° while in the stripping station to present the opening of the mold in a position more suitable for removing the molded article from the mold.

4. A method of molding thermoplastic material comprising moving a mold through successive stations, said successive station including a station for heating the mold to at least the fusing temperature of the thermoplastic material, a mating station for mating the mold with a slush box in molding material receiving relationship, a station for transferring the desired amount of molding material to the mold from the slush box by rotation thereof while the mold and slush box are in mated relationship, a separating station for disengaging the mated mold and slush box to leave at least a coating of the thermoplastic material on the mold surface, a station for completing the fusing of the molding material in said mold, a station for cooling the mold and a station for stripping the molded article from the mold, each mold being moved independent of the movement of the slush box from the separating station to the mating station but being moved in mating relationship with the slush box from the mating station to the separating station.

References Cited

UNITED STATES PATENTS

| | | | |
|---|---|---|---|
| 1,354,732 | 10/1920 | Disinger | 164—335 |
| 1,958,422 | 5/1934 | Dinzl. | |
| 2,027,163 | 1/1936 | Grubman. | |
| 2,629,131 | 2/1953 | Martin et al. | |
| 2,732,584 | 1/1956 | Bishop. | |
| 2,834,986 | 5/1958 | Bailey et al. | |
| 3,293,691 | 12/1966 | Osgood. | |

WILLIAM J. STEPHENSON, Primary Examiner

U.S. Cl. X.R.

18—4, 26; 164—235; 264—302